United States Patent [19]

Nijman et al.

[11] 4,313,034
[45] Jan. 26, 1982

[54] CONNECTING CIRCUIT FOR A TELEPHONE LINE

[75] Inventors: Aloysius J. Nijman; Franciscus A. C. M. Schoofs, both of Eindhoven, Netherlands

[73] Assignee: U.S. Philips Corporation, New York, N.Y.

[21] Appl. No.: 142,306

[22] Filed: Apr. 21, 1980

[30] Foreign Application Priority Data

May 10, 1979 [NL] Netherlands .................. 7903665

[51] Int. Cl.³ .................. H04M 3/02; H04B 3/36
[52] U.S. Cl. ..................... 179/16 F; 179/18 FA
[58] Field of Search ............ 179/16 F, 16 AA, 18 F, 179/18 FA, 81 R, 84 R, 70, 170 R, 170 NC, 77

[56] References Cited

U.S. PATENT DOCUMENTS 4,099,032  7/1978  Roge et al. .............. 179/18 FA
4,192,974  3/1980  Kiko ......................... 179/16 F
4,203,009  5/1980  Tattersall ................ 179/18 FA Primary Examiner—Thomas A. Robinson
Attorney, Agent, or Firm—Thomas A. Briody; William J. Streeter; Laurence A. Wright

[57] ABSTRACT

Connecting circuit for a telephone line comprising a pair of amplifiers whose outputs are connected to the one and to the other wire of the telephone line, respectively. Longitudinal currents which are induced in the telephone line and may negatively affect the proper functioning of the connecting circuit constitute a problem. The connecting circuit uses four current detection circuits (3, 4, 5, 6) for separately detecting the positive and negative currents in the wires of the telephone line. These separately detected currents are processed so that the desired opeeration of the connecting circuit is maintained even in the presence of longitudinal currents which exceed the loop currents.

6 Claims, 4 Drawing Figures

CONNECTING CIRCUIT FOR A TELEPHONE LINE

The invention relates to a connecting circuit for a telephone line comprising a pair of amplifiers the outputs of which are connected to one and to the other wire, respectively, of the telephone line and whose positive and negative supply terminals are connected to the corresponding terminals of a supply source.

BACKGROUND OF THE INVENTION

Such a connecting circuit is, for example, known from the French Patent Application No. 7731145. The amplifiers are there used to feed the subscriber's line with direct current signals (DC-supply, polarity reversal) and alternating current signals (ringing). These amplifiers can also be used to apply the speech signals to the subscriber's line.

It is an object of the invention to derive signals from the telephone line in a manner which can withstand longitudinal currents flowing in the telephone line. These derived signals can be used for a plurality of purposes, for example to obtain (a) an output signal which is proportional to th loop current and independent of the longitudinal current in the telephone line for providing an output for the speech signal and an output for the loop state; (b) an output signal which is proportional to the longitudinal current and independent of the loop current and (c) feedback signals for the amplifier for simulating certain impedances which can withstand longitudinal currents through the outputs of the fed back amplifiers.

SUMMARY OF THE INVENTION

The connecting circuit according to the invention is characterized in that four current detection circuits, each having a linear transfer characteristic, are respectively connected in the connections between the supply terminals of the amplifiers and the supply source, and that means are provided for combining the output signals of the current detection circuits, which are connected in the supply leads of a same amplifier for forming output signals which depend linearly on the currents in the wire of the telephone line, irrespectfive of whether or not the currents exceed the loop currents.

BRIEF DESCRIPTION OF THE DRAWINGS

The invention and its advantages will now be further explained with reference to the drawings wherein.

DESCRIPTION OF THE PREFERRED EMBODIMENTS

Figure 1:
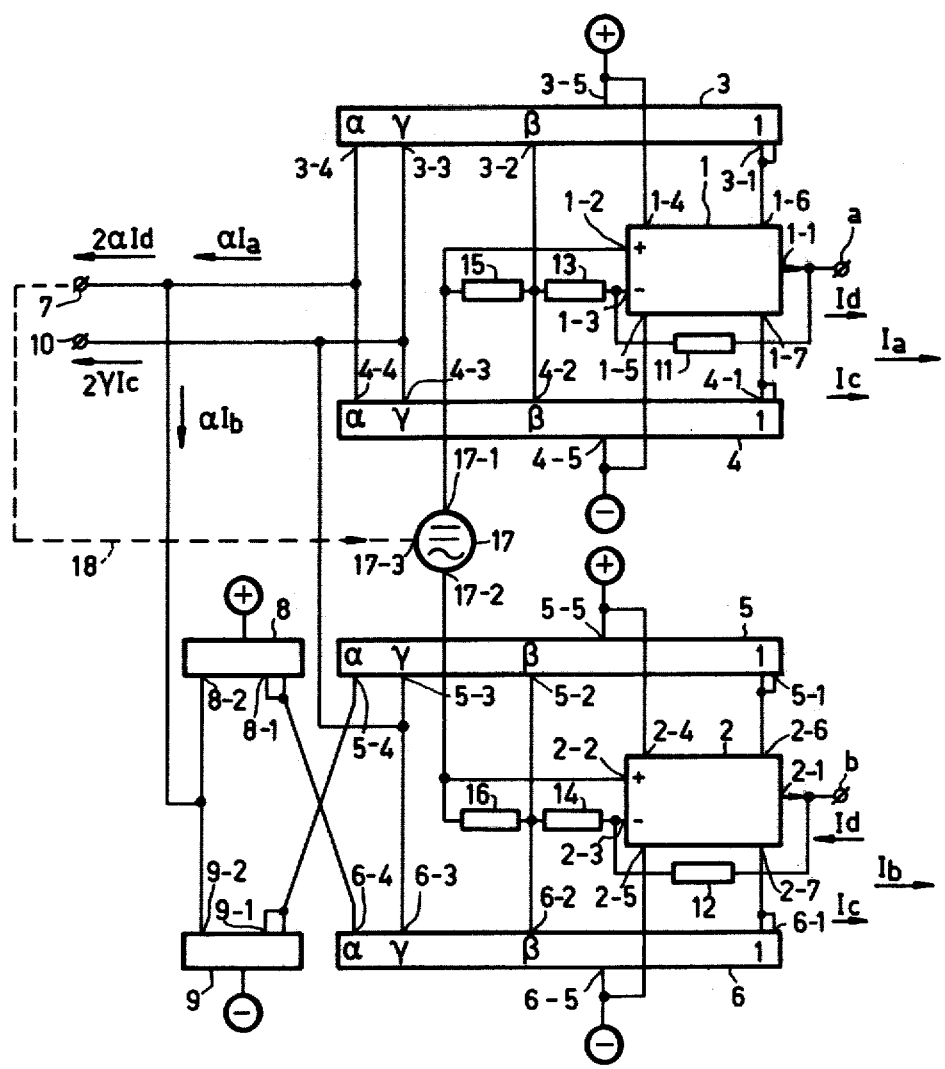
FIG. 1 is a block diagram of a connecting circuit according to the invention.
Figure 2:
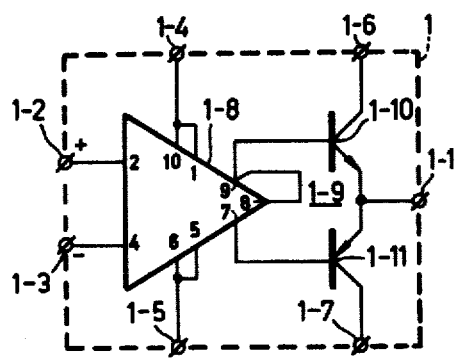
FIG. 2 is a circuit diagram of an amplifier for use in the connecting circuit shown in FIG. 1.

The connecting circuit comprises two terminals a and b for the respective connection thereto of the a-wire and the b-wire of a subscriber's line. An amplifier 1 has its output 1-1 connected to terminal a and an amplifier 2 has its output 2-1 connected to to terminal b. In addition, amplifier 1 comprises a non-inverting input 1-2 and an inverting input 1-3 and the supply terminals 1-4, 1-5, 1-6 and 1-7. The supply terminals 1-4 and 1-5 are used to feed the input section of amplifier 1; the supply terminals 1-6 and 1-7 are used to feed the output stage of amplifier 1. The construction of amplifier 2 is equal to the construction of amplifier 1. It should be understood that the current Ia or Ib flowing in the a or b-wire is applied to the amplifier via supply terminal 1-6 or 2-6 or supply terminals 1-7 or 2-7, depending on the polarity of the current. FIG. 2 shows an embodiment of amplifier 1 or 2. This amplifier comprises a pre-amplifier 1-8 of the type Signetics NE/SE 540 and an output amplifier 1-9, consisting of a pair of complementary transistors 1-10, 1-11 in a common emitter circuit. The supply terminals 1-6 and 1-7 of amplifier 1 are the supply terminals of the output amplifier 1-9 and it will be clear that the current which flows in the output 1-1, neglecting the base current of transistor 1-10 or 1-11, is applied through supply terminal 1-6 or 1-7.

The base current can have a very low value by the use of a Darlington output stage or field effect transistors.

The positive supply terminal 1-4 or 2-4 is directly connected to the positive pole of a supply source, not shown. The negative supply terminal 1-5 or 2-5 is directly connected to the negative pole of the supply source.

For deriving signals from the telephone line, the connecting circuit comprises four current detection circuits 3, 4, 5 and 6 having a linear transfer characteristic, and which are arranged in the connections between the supply terminals 1-6, 1-7, 2-6, 2-7 of the amplifiers 1 and 2 and the poles of the supply source. These current detection circuits are constructed as current mirror circuits.

Figure 3:
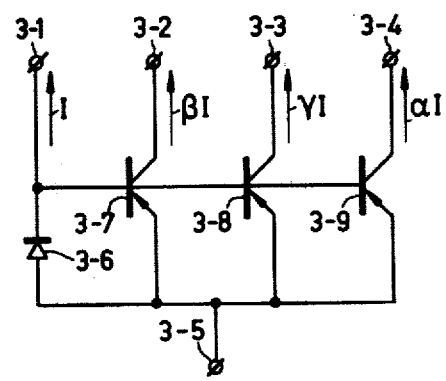
FIG. 3 is a circuit diagram of a known current mirror circuit for use in the connecting circuit shown in FIG. 1.

FIG. 3 shows the circuit diagram of current mirror circuit 3, which comprises the input terminal 3-1, the output terminals 3-2, 3-3, 3-4 and the common terminal 3-5. A diode 3-6 is connected between terminal 3-5 and input terminal 3-1 and the emitter-base junctions of the transistors 3-7, 3-8 and 3-9 are arranged in parallel with the diode. The collectors of these transistors provide the output terminals of the current mirror circuit. The current ratio factors $\alpha$, $\beta$ and $\gamma$, shown in FIG. 3, can be realized by means of a suitable choice of the relative sizes of the emitter surfaces of transistors. Current mirror circuit 5 is constructed in a similar manner as current mirror circuit 3. The current mirror circuits 4 and 6 differ from the current mirror circuits 3 and 5 by the direction in which the currents flow through the circuit. The circuit diagram shown in FIG. 3 can be used for these current mirror circuits when the polarity of the diode 3-6 is reversed and the conductivity type of the transistors is changed from the pnp-type, as shown, to the npn-type.

In practice it is often desirable that a signal which is proportional to the loop current flowing through the telephone line and which is independent of the longitudinal currents is present at an output terminal of the connecting circuit. This signal contains the information about the state of the subscriber's loop and the speech information of the subscriber's and must be affected as little as possible by longitudinal currents induced in the telephone line by external causes.

The currents Ia and Ib flowing in the a-wire and b-wire can be written:

$$Ia = Ic + Id$$

$$Ib = Ic - Id \quad (1)$$

wherein Id represents the loop current, sometimes called the difference current component, and Ic represents the longitudinal current, sometimes called the common current component.

A signal which is proportional to Id is obtained in the following manner. The outputs 3-4 and 4-4 of the current mirrors 3 and 4 are interconnected and connected to output terminal 7. In addition, the output 5-4 or 6-4 of current mirror 5 or 6 is connected to the input 9-1 or 8-1 of current mirror 9 or 8. The outputs 8-2 and 9-2 of the current mirrors 8 and 9 are interconnected and connected to output terminal 7. The current mirrors 8 and 9 have a current ratio 1:1 and have for their function to reverse the direction of the current $\alpha$ Ib. The result is that the current 2 $\alpha$ Id is applied to terminal 7.

A signal which is proportional to Ic is obtained in the following manner. The outputs 3-3 and 4-3 of the current mirrors 3 and 4 are interconnected and connected to output terminal 10. In addition, the outputs 5-3 and 6-3 of the current mirrors 5 and 6 are interconnected and connected to output terminal 10. This results in that the current 2 $\gamma$ Ic is applied to terminal 10.

It is important that the current 2 $\alpha$ Id which is applied to terminal 7 is independent of the longitudinal current Ic, whose polarity may be either positive or negative, and which may be smaller or greater than the loop current Id. The separate detection of the positive and negative currents flowing in the wires of the telephone line and the use of the current mirrors 3, 4, 5 and 6 ensure that the difference current component and the longitudinal current component are detectable independently from one another.

In practice it may be desirable that the connecting circuit, seen from the direction of the subscriber's line has a given impedance and that this impedance can withstand longitudinal currents. In the present case this impedance is realized separately for each one of the wires of the telephone line.

The impedance for the a or b-wire is realized in the following manner. A resistor 11 or 12 is arranged between the output 1-1 or 2-1 of amplifier 1 or 2 and the inverting input 1-3 or 2-3. In addition, a resistor 13 or 14 is arranged in series with a resistor 15 or 16 between the inverting input 1-3 or 2-3 and the non-inverting input 1-2 or 2-2. The output 3-2 or 5-2 of current mirror 3 or 5 is connected to the output 4-2 or 6-2 of current mirror 4 or 6 and to the node of resistor 13 or 14 and resistor 15 or 16. The current $\beta$ Ia or $\beta$ Ib which flows to this node effects a feedback from the output of amplifier 1 or 2 to the input thereof.

R1 is the value of the resistors 15 and 16, R2 the value of the resistors 13 and 14 and R3 the value of the resistors 11 and 12, the impedance ZO seen from the direction on the a (b)-wire being defined by :

$$Z_O = R1R3/R1 + (R1 + R2)/\beta \quad (2)$$

When a voltage source 17 having the voltage $V_o$, which source may at the same time be the DC-reference source and an a.c. voltage source, is connected between the non-inverting inputs 1-2 and 2-2 of the amplifiers 1 and 2, the no-load voltage between the outputs 1-1 and 2-1 will be $V_o$. The connecting circuit, seen from the telephone line, may be thought as being replaced by a voltage source having the voltage $V_o$ and having arranged in series on both sides an impedance $Z_o$ as defined by expression (2). The separate detection of the positive and negative currents flowing in the wires of the telephone line, by means of the current mirrors 3, 4 and 5, 6, respectively, and the separately effected feedback of the currents Ia and Ib ensures, that the impedance $Z_o$ is still presented to the telephone line, even in the case that disturbing longitudinal currents flow in the line.

Figure 4:
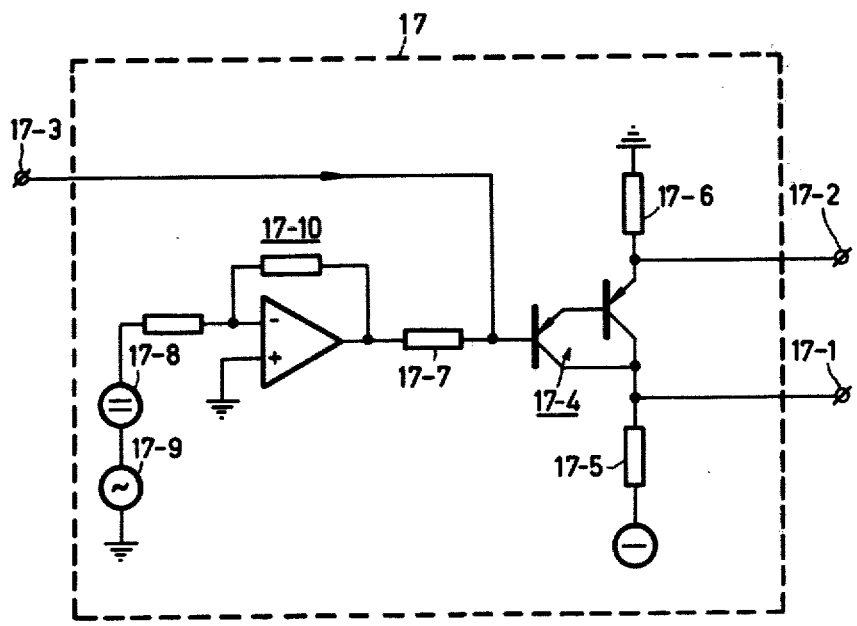
FIG. 4 is a circuit diagram of an embodiment of a voltage source used in the connecting circuit.

It may be desirable that, seen from the direction of the telephone line, the connecting circuit shows a different impedance for the loop current than for the longitudinal current. This can be realized by providing a feedback whereby only the loop current Id is fed back. This feedback, which can be effected from output terminal 7 to voltage source 17 through the dotted connection 18, can be realized in the manner shown in FIG. 4.

From input terminal 17-3 the feedback signal is applied to a phase splitter consisting of a Darlington stage 17-4 comprising equal collector and emitter load resistors 17-5 and 17-6. The collector and emitter are connected to the terminals 17-1 and 17-2 of source 17.

The current 2 $\alpha$ Id which is applied to terminal 17-3 generates a feedback voltage across the impedance 17-7, this feedback voltage being applied in anti-phase through the Darlington stage 17-4 to the terminals 17-1 and 17-2 and from there to the inputs 1-2 and 2-2 of the amplifiers 1 and 2. As a result of this feedback the output of the terminating circuit presents a symmetrical impedance 4 $\alpha$ Z1 to the loop current Id flowing through the telephone line, when Z1 represents the value of the impedance 17-7.

From the sources 17-8 and 17-9 a bias voltage and signal voltage can be applied to the other side of the impedance 17-7 through a voltage amplifier 17-10, which has a low output impedance.

What is claimed is:

1. A connecting circuit for a telephone line comprising a pair of amplifiers whose outputs are connected to one and to the other wire, respectively, of the telephone line and whose positive and negative supply terminals are connected to the corresponding terminals of a supply source, characterized in that four current detection circuits each having a linear transfer characteristic, are respectively connected into the four connections between the supply terminals of the amplifiers and the supply source and that means are provided for combining the output signals of the current detection circuits connected in the supply leads of a same amplifier for forming output signals which are linearly dependent on the currents in the wires of the telephone line irrespective of whether or not the longitudinal currents exceed the loop currents.

2. A connecting circuit as claimed in claim 1, characterized in that the current detection circuits are constituted by current mirror circuits.

3. A connecting circuit as claimed in claim 1, characterized in that output signals obtained from an output of each one of the current detection circuits are combined to form an output signal which is proportional to the loop current in the telephone line.

4. A connecting circuit as claimed in claim 2, characterized in that the output signals obtained from an output of each of the current detection circuits are combined to form an output signal which is proportional to the longitudinal currents in the telephone line.

5. A connecting circuit as claimed in claim 1, characterized in that the output signals obtained from an output of each one of the two current detection circuits associated with a same amplifier are combined to form a feedback signal for that amplifier.

6. A connecting circuit as claimed in claim 3, characterized in that the output signal which is proportional to the loop current is applied to an impedance and that means are provided for converting the voltage produced across the impedance into two equal voltages having mutually opposite phases and for applying these voltages to the input of the one and of the other amplifier, respectively.

* * * * *